(12) United States Patent
Garza et al.

(10) Patent No.: US 7,451,721 B1
(45) Date of Patent: Nov. 18, 2008

(54) UTILITY LOCATION INDICATOR APPARATUS

(76) Inventors: Mario J. Garza, 2064 Sunsset Dr., Zapata, TX (US) 78076; Amada V. Garza, 2064 Sunset Dr., Zapata, TX (US) 78076

( * ) Notice: Subject to any disclaimer, the term of this patent is extended or adjusted under 35 U.S.C. 154(b) by 0 days.

(21) Appl. No.: 11/340,750

(22) Filed: Jan. 27, 2006

(51) Int. Cl.
*F16L 1/11* (2006.01)
*G09F 19/22* (2006.01)

(52) U.S. Cl. .................................................. 116/209
(58) Field of Classification Search ................. 116/209; 33/1 H
See application file for complete search history.

(56) References Cited

U.S. PATENT DOCUMENTS

| | | | | |
|---|---|---|---|---|
| 3,204,355 | A * | 9/1965 | Whitman | 40/660 |
| 3,523,515 | A * | 8/1970 | Brown | 116/209 |
| 3,694,009 | A * | 9/1972 | Phillips | 285/197 |
| 4,516,069 | A * | 5/1985 | Schmanski | 324/71.1 |
| 4,991,536 | A * | 2/1991 | Moshofsky | 116/209 |
| 5,247,900 | A | 9/1993 | Sobczak | |
| 5,269,565 | A * | 12/1993 | Langner | 285/2 |
| 5,377,388 | A * | 1/1995 | DeBever | 24/16 PB |
| 5,467,729 | A * | 11/1995 | Yamada et al. | 116/209 |
| 5,771,835 | A | 6/1998 | Schneider | |
| 5,881,435 | A * | 3/1999 | Jermyn, Jr. | 24/16 PB |
| 5,935,433 | A * | 8/1999 | Stefanini | 210/222 |
| D424,960 | S | 5/2000 | Greene et al. | |
| 6,095,081 | A | 8/2000 | Gochenour | |
| 6,098,384 | A * | 8/2000 | Porrello | 54/36 |
| 6,132,141 | A * | 10/2000 | Kirk | 405/172 |
| 6,202,588 | B1 * | 3/2001 | Hebrard | 116/209 |
| 6,240,671 | B1 * | 6/2001 | Galfidi, Jr. | 42/90 |
| 6,271,667 | B1 * | 8/2001 | Minarovic | 324/326 |
| 6,378,814 | B1 * | 4/2002 | Kaplan | 248/71 |
| 6,578,512 | B2 | 6/2003 | Truax | |
| 6,609,855 | B1 | 8/2003 | Eslambolchi et al. | |
| 6,827,044 | B2 * | 12/2004 | Lobanoff et al. | 119/771 |
| 2005/0204515 | A1 * | 9/2005 | Hewes | 24/16 PB |
| 2007/0044329 | A1 * | 3/2007 | Mitchell et al. | 33/1 E |
| 2007/0199182 | A1 * | 8/2007 | Johnson | 24/265 BC |

FOREIGN PATENT DOCUMENTS

| | | | |
|---|---|---|---|
| FR | 2809495 A1 | * | 11/2001 |
| JP | 2000226043 A | * | 8/2000 |
| JP | 2002039436 A | * | 2/2002 |
| KR | 2002014682 A | * | 2/2002 |

OTHER PUBLICATIONS

Derwent 2002-555526 abstract of KR 2002014685 A, titled "Underground pipe display stand", published Feb. 25, 2002, Inventor: Lee, T.S., Assignee: Korea Constr Management Corp [KOCSN].*

* cited by examiner

*Primary Examiner*—R. A. Smith

(57) ABSTRACT

A utility location indicator apparatus for indicating the location and general direction of lie of an underground utility includes a marker being configured to extend upwardly from a utility pipe to indicate a location of the utility pipe under a ground surface. The marker is elongated to extend upwardly through the ground over the utility pipe. A plurality of incremental indicia is positioned on the marker and incrementally extending along a length of the marker. The incremental indicia is configured to indicate a depth of the ground positioned over the utility pipe to alert a user to the depth the user can dig before encountering the utility pipe. A saddle is integrally coupled to a first end of the marker. The saddle is configured to extend over a portion of a circumference of the utility pipe to maintain alignment of said marker with the utility pipe.

6 Claims, 2 Drawing Sheets

UTILITY LOCATION INDICATOR APPARATUS

BACKGROUND OF THE INVENTION

1. Field of the Invention

The present invention relates to utility location markers and more particularly pertains to a new utility location marker for indicating the location and general direction of an underground utility line.

2. Description of the Prior Art

The use of utility location markers is known in the prior art. U.S. Pat. No. 5,771,835 describes a device for being coupled to a utility and being positioned just below the surface to indicate a direction of lie of the utility and the depth of the utility at installation. Another type of utility location marker is U.S. Pat. No. 6,095,081 having a location marker that can be selectively extended upwardly to alert a user to the location of the utility including the direction of lie and the depth of the utility at installation. Another type of utility location marker is U.S. Pat. No. 6,609,855 having utility conveyance that receives the utility is buried in the ground and releases a dye when exposed to water to dye the surrounding earth a color to indicate to the user the proximity of the utility when the user is digging.

While these devices fulfill their respective, particular objectives and requirements, the need remains for a device that has certain improved features to indicate the location and depth of the utility in the ground. The incremental indicia on the marker are not fixed solely at the time of installation of the utility and allow for the depth to be accurately indicated should the utility settle or the ground above the utility settle.

SUMMARY OF THE INVENTION

The present invention meets the needs presented above by generally comprising a marker being configured to extend upwardly from a utility pipe to indicate a location of the utility pipe under a ground surface. The marker is elongated to extend upwardly through the ground over the utility pipe. A plurality of incremental indicia is positioned on the marker and incrementally extending along a length of the marker. The incremental indicia is configured to indicate a depth of the ground positioned over the utility pipe to alert a user to the depth the user can dig before encountering the utility pipe. A saddle is integrally coupled to a first end of the marker. The saddle is configured to extend over a portion of a circumference of the utility pipe to maintain alignment of said marker with the utility pipe.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
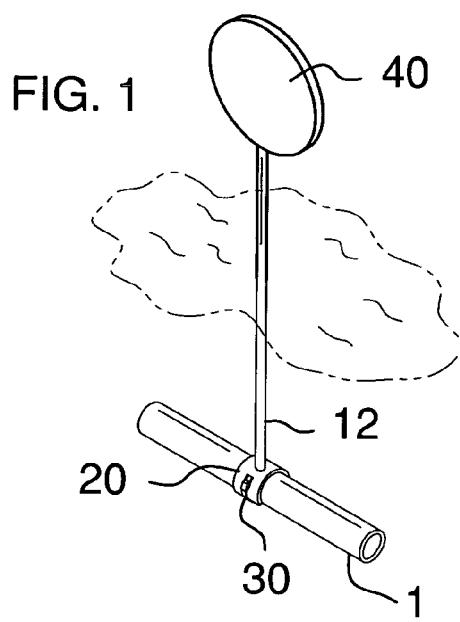
FIG. 1 is a perspective view of a utility location indicator apparatus according to the present invention.
Figure 2:
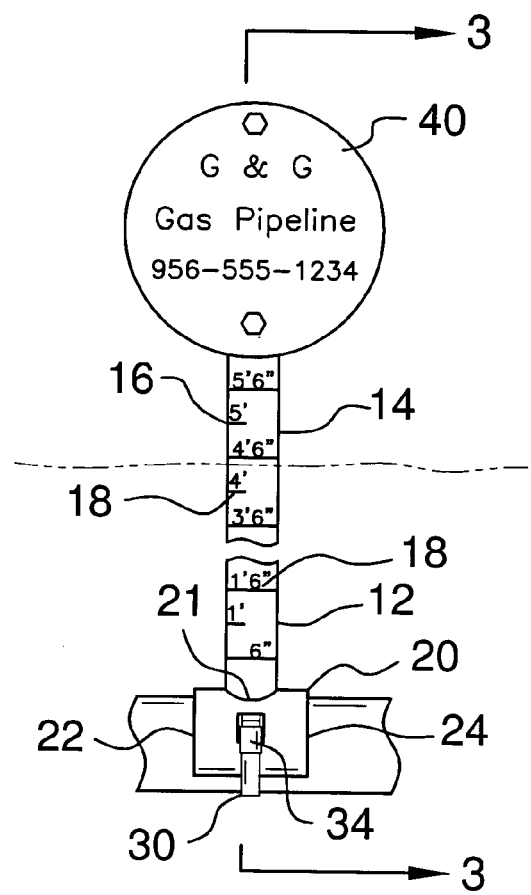
FIG. 2 is a front view of the present invention.
Figure 3:
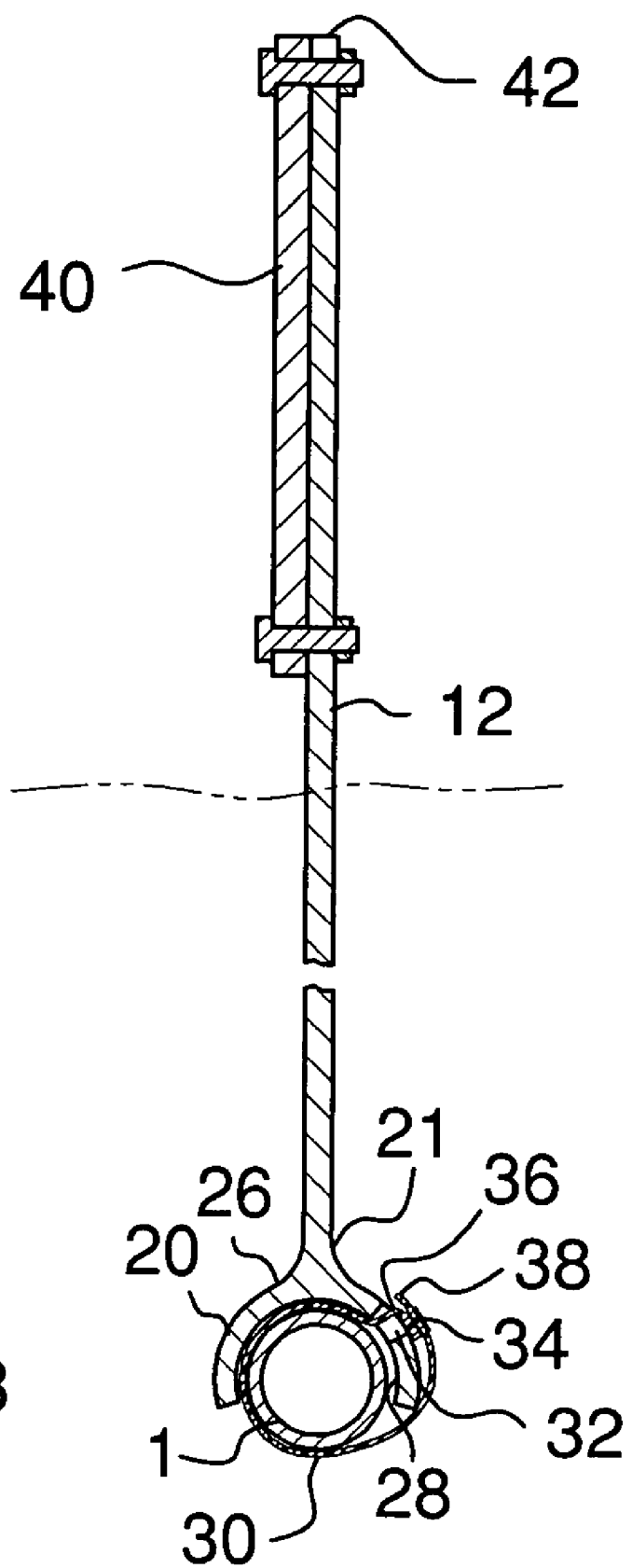
FIG. 3 is a cross-sectional view of the present invention taken along line 3-3 of FIG. 2.

With reference now to the drawings, and in particular to FIGS. 1 through 3 thereof, a new utility location marker embodying the principles and concepts of the present invention and generally designated by the reference numeral 10 will be described.

As best illustrated in FIGS. 1 through 3, the utility location indicator apparatus 10 generally comprises a marker 12 being configured to extend upwardly from a utility pipe 1 to indicate a location of the utility pipe 1 under the ground surface. The marker 12 is elongated to extend upwardly through the ground over the utility pipe 1. The marker 12 has a first lateral edge 14 and a second lateral edge 16. A line extending between the first 14 and second lateral edges 16 defines a width of the marker 12. A plurality of incremental indicia 18 is positioned on the marker 12 and incrementally extends along a length of the marker 12. The incremental indicia 18 is configured to indicate a depth of the ground positioned over the utility pipe 1 to alert a user to the depth the user can dig before encountering the utility pipe 1.

A saddle 20 is integrally coupled to a first end 21 of the marker 12. The saddle 20 is configured to extend over a portion of a circumference of the utility pipe 1 to maintain alignment of the marker 12 with the utility pipe 1. The saddle 20 has a first side edge 22, a second side edge 24, a top surface 26 and a lower surface 28. A length of the saddle 20 is defined by a line extending between the first 22 and second 24 side edges. The length of the saddle 20 is aligned with the width of the marker 12 to permit the width of the marker 12 to indicate a direction the utility pipe 1 lies. The saddle 20 has a semi-cylindrical shape wherein the lower surface 28 is concavely arcuate.

A strap 30 extends through an aperture 32 in the saddle 20 and extends around the utility pipe 1 and a portion of the saddle 20 to secure the saddle 20 to the utility pipe 1. A buckle 34 is coupled to a base end 36 of the strap 30 and selectively receives a free end 38 of the strap 30 to secure the free end 38 to the base end 36 and secure the strap 30 around the utility pipe 1. The buckle 34 is frangible to permit the free end 38 to separate from the buckle 34 to inhibit the saddle 20 inadvertently applying force to the utility pipe 1 and breaking the utility pipe 1 when the marker 12 is impacted with a predetermined amount of force.

A placard 40 may be coupled to the marker 12 proximate a second end 42 of the marker 12 positioned above the ground surface. The placard 40 is configured to indicate an owner and maintainer of the utility pipe 1.

In use, the free end 38 of the strap 30 is extended through the aperture 32 in the saddle 20. The strap 30 is extended around the utility pipe 1 and the free end 38 is engaged to the buckle 34 to secure the saddle 20 to the utility pipe 1. The marker 12 extends upward from the utility pipe 1 and indicates the depth of the ground above the utility pipe 1 when the pipe is buried. As the depth of the ground above the utility pipe 1 changes from settling of the utility pipe 1 or the ground it is indicated by the incremental indicia 18 on the marker 12.

The placard 40 may be coupled to the marker 12 to indicate the owner of the utility pipe 1. Additionally, the buckle 34 is frangible to inhibit damage to the utility pipe 1 should the marker 12 be struck with a predetermined amount of force. The predetermined amount of force may be changed depending on the type of materials being used for the utility pipe.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification and intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A utility location indicator system comprising:
   a utility pipe positioned under a ground surface;
   a marker being configured to extend upwardly from the utility pipe to indicate a location of the utility pipe under the ground surface, said marker being elongated to extend upwardly through the ground over the utility pipe;
   a plurality of incremental indicia being positioned on said marker and incrementally extending along a length of said marker, said incremental indicia being configured to indicate a depth of the ground positioned over the utility pipe to alert a user to the depth the user can dig before encountering the utility pipe;
   a saddle being integrally coupled to a first end of said marker, said saddle being configured to extend over a portion of a circumference of the utility pipe to maintain alignment of said marker with the utility pipe, said saddle having a single aperture extending therethrough; and
   a strap extending through said aperture in said saddle and extending around the utility pipe and a portion of said saddle to secure said saddle to the utility pipe, a buckle being coupled to a base end of said strap and selectively receiving a free end of said strap to secure said free end to said base end and secure said strap around the utility pipe.

2. The system according to claim 1, wherein said marker has a first lateral edge and a second lateral edge, a width of said marker being defined by a line extending between said first and second lateral edges, said saddle having a first side edge, a second side edge, a top surface and a lower surface, a length of said saddle being defined by a line extending between said first and second side edges, the length of said saddle being aligned with the width of said marker to permit said width of said marker to indicate a direction the utility pipe lies.

3. The system according to claim 2, wherein said saddle has a semi-cylindrical shape wherein said lower surface is concavely arcuate.

4. The system according to claim 1, wherein said buckle is frangible with respect to said pipe to permit said free end to separate from said buckle to inhibit said saddle inadvertently applying force to the utility pipe and breaking the utility pipe when said marker is impacted with a predetermined amount of force.

5. The system according to claim 1, further including a placard being coupled to said marker proximate a second end of said marker positioned above the ground surface, said placard being configured to indicate an owner and maintainer of the utility pipe.

6. A utility location indicator system comprising:
   a utility pipe positioned under a ground surface;
   a marker being configured to extend upwardly from the utility pipe to indicate a location of the utility pipe under the ground surface, said marker being elongated to extend upwardly through the ground over the utility pipe, said marker having a first lateral edge and a second lateral edge, a width of said marker being defined by a line extending between said first and second lateral edges;
   a plurality of incremental indicia being positioned on said marker and incrementally extending along a length of said marker, said incremental indicia being configured to indicate a depth of the ground positioned over the utility pipe to alert a user to the depth the user can dig before encountering the utility pipe;
   a saddle being integrally coupled to a first end of said marker, said saddle being configured to extend over a portion of a circumference of the utility pipe to maintain alignment of said marker with the utility pipe, said saddle having a first side edge, a second side edge, a top surface and a lower surface, a length of said saddle being defined by a line extending between said first and second side edges, the length of said saddle being aligned with the width of said marker to permit said width of said marker to indicate a direction the utility pipe lies, said saddle having a semi-cylindrical shape wherein said lower surface is concavely arcuate, said saddle having a single aperture extending therethrough;
   a strap extending through said aperture in said saddle and extending around the utility pipe and a portion of said saddle to secure said saddle to the utility pipe;
   a buckle being coupled to a base end of said strap and selectively receiving a free end of said strap to secure said free end to said base end and secure said strap around the utility pipe, said buckle being frangible with respect to said pipe to permit said free end to separate from said buckle to inhibit said saddle inadvertently applying force to the utility pipe and breaking the utility pipe when said marker is impacted with a predetermined amount of force; and
   a placard being coupled to said marker proximate a second end of said marker positioned above the ground surface, said placard being configured to indicate an owner and maintainer of the utility pipe.

* * * * *